UNITED STATES PATENT OFFICE.

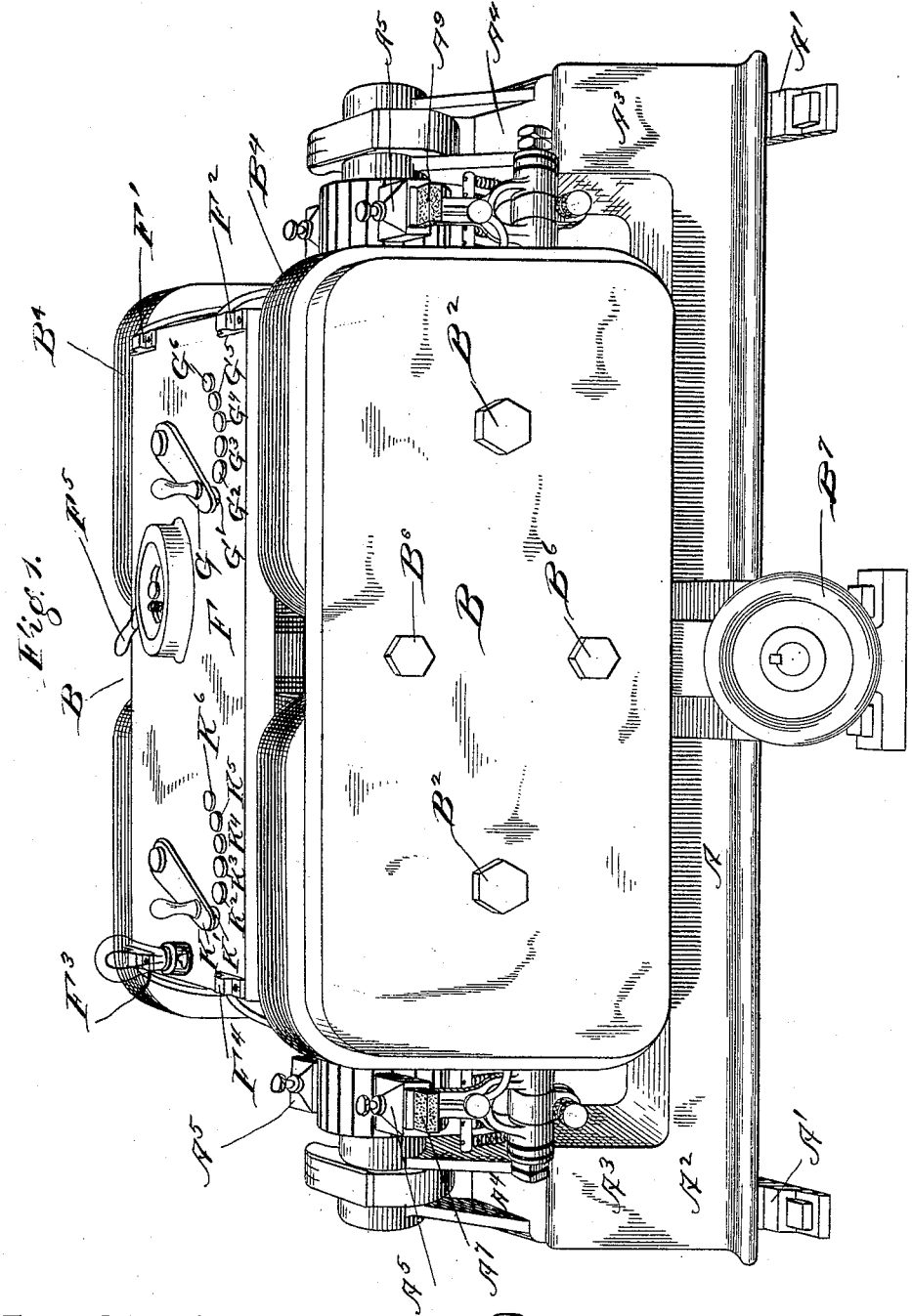

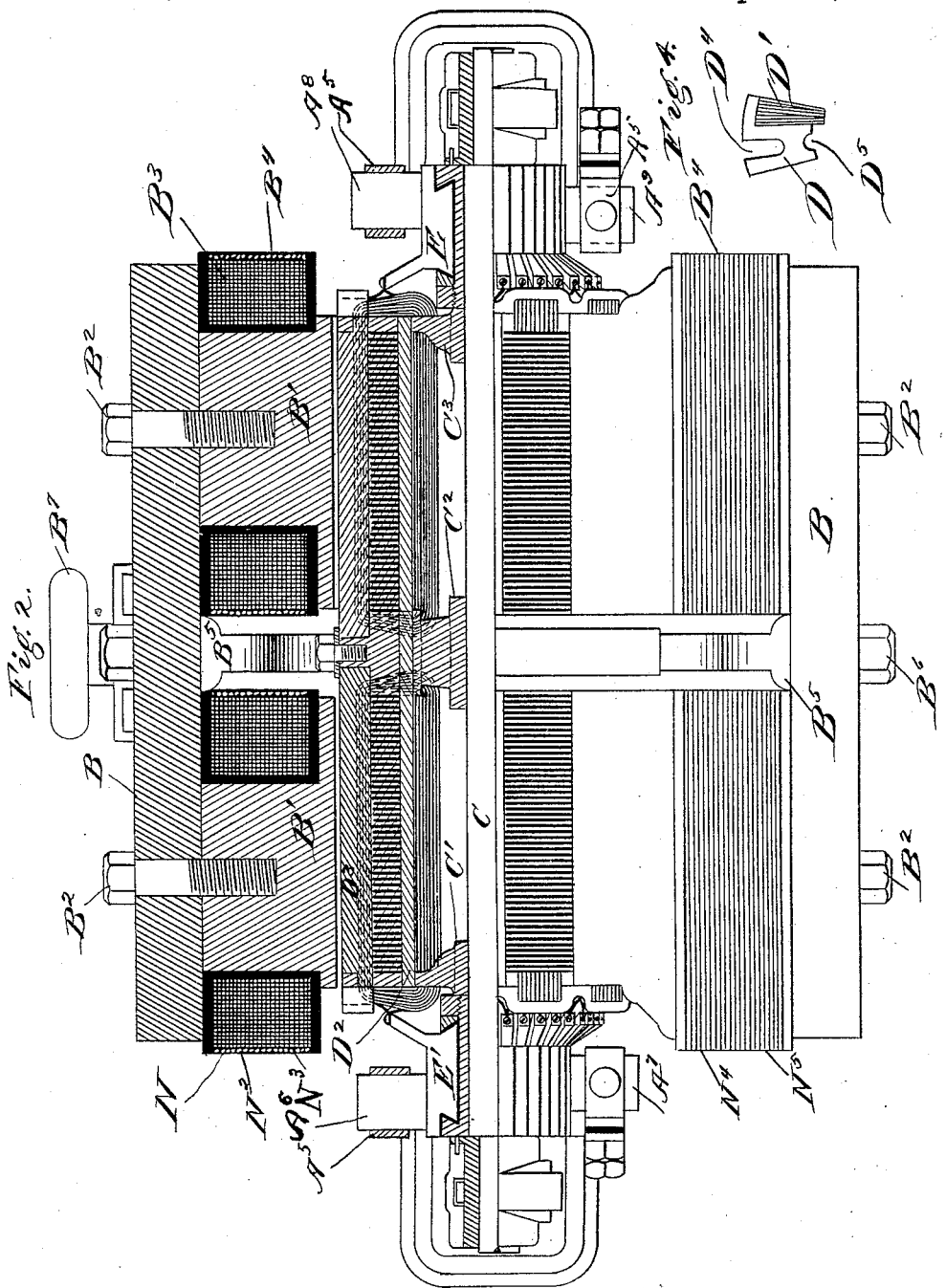

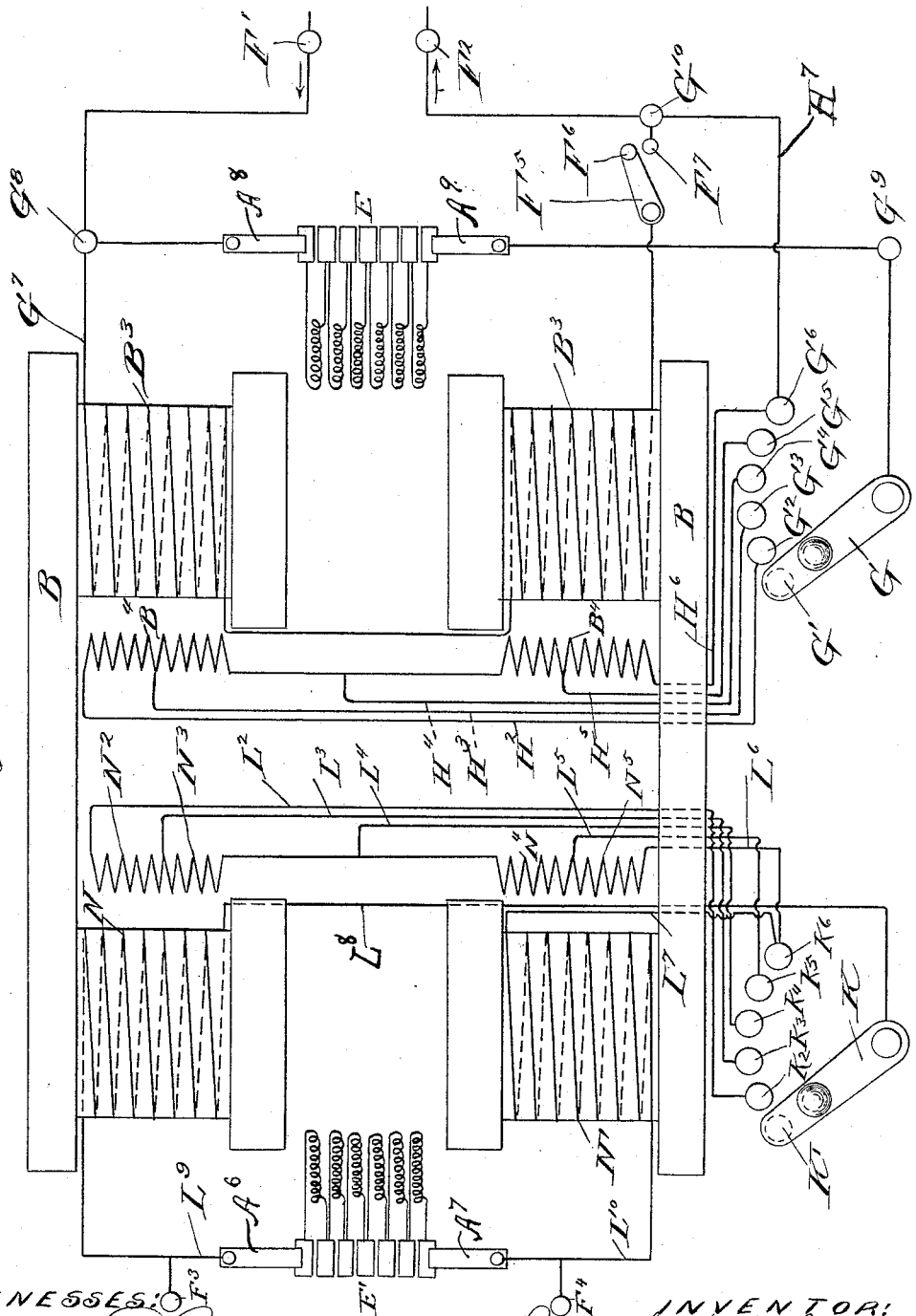

DAVID H. WILSON, OF CHICAGO, ILLINOIS.

DYNAMO-ELECTRIC MACHINE.

SPECIFICATION forming part of Letters Patent No. 526,170, dated September 18, 1894.

Application filed August 17, 1893. Serial No. 483,331. (No model.)

*To all whom it may concern:*

Be it known that I, DAVID H. WILSON, a citizen of the United States, residing at Chicago, Cook county, Illinois, have invented a new and useful Improvement in Dynamo-Electric Machines, of which the following is a specification.

My invention relates to dynamo electric machines.

The object of my invention is to provide an improved motor and generator combined.

Referring to the accompanying drawings: Figure 1 is a perspective view of the machine. Fig. 2 is a plan view in part section. Fig. 3 is a diagram of the circuits. Fig. 4 is a view of one of the armature plates.

Like parts are indicated by the same letters in all the figures.

A is the base of the machine and is suitably supported upon the guides $A'$, $A'$.

B, B, are the field magnet yokes, and are provided with the inwardly projecting pole pieces $B'$, $B'$.

$B^2$, $B^2$ are the bolts connecting the yokes B, B, and pole pieces $B'$, $B'$, together. The pole pieces opposite the motor armature, *i. e.*, the motor magnets, are provided with the shunt windings $B^3$, $B^3$, and the series winding $B^4$, $B^4$. The shunt and series coils are wound in the same direction, *i. e.*, so as to aid each other in strengthening the fields. The series windings are composed of resistance wire of some sort, as for example, German silver wire, and are used for resistances as such are commonly used in the control of dynamo electric machines. The pole pieces opposite the generator armature, *i. e.*, the generator magnets, carry the shunt windings N, $N'$, and in series with said shunt windings, the resistances $N^2$, $N^3$, $N^4$, $N^5$. (See Fig. 3.) Said resistances are wound so as to increase the effect of the shunt windings. The field coils of the motor and generator are electrically, entirely separate from each other.

$B^5$, $B^5$ are standards which rise from the base A and to which are fastened the yokes B by the bolts $B^6$, $B^6$. Said yokes are fastened at their neutral points to the standards $B^5$, $B^5$.

$B^7$ is a hand wheel by which the machine is moved along the guides $A'$, $A'$, to regulate the tension on the belt. The frame A has projecting toward each end the portions $A^2$ with the upwardly turned ends $A^3$, $A^3$, from which rise the standards $A^4$, $A^4$ upon which are the journals of the armature shaft C. The standards $A^4$, $A^4$ also support the brush holders $A^5$, $A^5$, which carry the brushes $A^6$, $A^7$, $A^8$, $A^9$. Fastened to the armature shaft C are the three spiders $C'$, $C^2$, $C^3$, between which are the two armatures of the motor and generator. The armature of the generator is held in position by the spiders $C'$, $C^2$, and the armature of the motor by the spiders $C^2$ and $C^3$. The two armatures are similar in construction and are in part the subject matter of a separate application filed December 27, 1892, Serial No. 456,601. Hence it will not be necessary to describe them in detail. Said armatures are composed of sections made up of the slotted plates D, each section carrying a coil $D'$. These coils are first separately wound and then slipped into place on the sections after said sections are built up. These sections are held in position in the armature by the bars $D^3$ and rods $D^2$ fitting into the notches $D^4$, $D^5$ in the plates D. Said bars and rods are in turn held in position by the spiders $C'$, $C^2$, $C^3$. By this arrangement if an armature coil is injured a section of such armature can be readily removed and a new coil slipped into place. The coils of the motor armature are connected to the segments E of the commutator on the right and the coils of the generator armature to the segments $E'$ of the commutator on the left.

F is a switch board attached to the machine.

$F'$, $F^2$ are the terminals of the motor and $F^3$, $F^4$, the terminals of the generator.

$F^5$ is a switch by which the field magnet circuit of the motor is opened and closed. $F^6$ is the dead terminal for such switch and $F^7$ the live terminal.

G is a switch which controls the series coils of the motor. $G'$, $G^2$, $G^3$, $G^4$, $G^5$, $G^6$, are the terminals along which said switch moves. $H^2$, $H^3$, $H^4$, $H^5$, $H^6$, are wires connecting said terminals with the series coils $B^4$, $B^4$.

$H^7$ is a wire leading from terminal $G^6$ to the terminal $F^2$.

$G^7$ is the wire leading from the terminal $F'$ to the shunt coils $B^3$.

$G^8$, $G^9$, $G^{10}$, are binding posts.

K is a switch which controls the resistances $N^2$, $N^3$, $N^4$, $N^5$ in the field circuit of the generator, and $K'$, $K^2$, $K^3$, $K^4$, $K^5$, $K^6$, are the terminals along which said switch moves. $L^2$, $L^3$, $L^4$, $L^5$, $L^6$, are the wires connecting said terminals with the resistances $N^2$, $N^3$, &c.

$L^7$ is a wire connecting the terminals $K^6$ with the field coils $N'$.

$L^8$ is a wire connecting the field coil N with the switch K.

$L^9$, $L^{10}$, are wires leading from the brushes to the field coils.

It is evident that the form and arrangement of these several parts may be altered or changed without departing from the spirit of my invention, and therefore, I do not wish to be limited to the precise construction shown.

The use and operation of my invention are as follows: This machine is particularly fitted for use in electro-plating, welding, or the like, i. e., it is best adapted to be used in producing from the common commercial continuous current, another current differing widely in amperage and electro motive force. When it is desired to start the machine, the switch $F^5$, is closed, i. e., brought in contact with the terminal $F^7$. This closes the circuit through the shunt winding $B^3$ of the field coils of the motor. The current may be traced as follows: from the terminal $F'$ to the binding post $G^8$; thence by wire $G^7$ through shunt coils $B^3$; thence to terminal $F^2$. The switch G is then moved until it is in contact with the terminal $G^2$. This completes the circuit through the motor armature and the series windings and since said series windings are the resistances used in governing the motor, the whole resistance will be in series with the armature. When the switch is in this position the current may be traced as follows: from terminal $F'$ to binding post $G^8$; thence through armature coils; thence to binding post $G^9$; thence to switch G; thence by wire $H^2$ to series coils $B^4$; thence through said series coils $B^4$; thence by wire $H^7$ to terminal $F^2$. The armature of the motor will now start to rotate, causing the armature of the generator also to rotate and as the speed and hence back electro motive force of the motor increases, the switch G is moved farther to the right, the movement to each successive terminal cutting out part of the series coils $B^4$, $B^4$. When the motor reaches its normal speed, the switch G is moved to the terminal $G^6$, in which position all the series windings are out of circuit. The switch K is now moved to the terminal $K^2$ which closes the circuit through the field coils N, $N'$, and resistances $N^2$, $N^3$, $N^4$, $N^5$, and the generator starts to build up. The motor aids the generator in building up as some of the magnetism from its field magnets is conducted by the yokes B, B to the field magnets of said generator. The generator is regulated by moving the switch K along the terminals $K^2$, $K^3$, &c., so as to cut out more or less of the resistances $N^2$, $N^3$, &c., depending on the load carried by the generator.

It will be seen that this invention constitutes a complete machine in itself, and does away with switch boards, rheostats and the like, and their corresponding connections. All that is necessary to get the machine ready for operation is to make the connections with the source of supply, and the line on which the generated current is to be used.

I claim—

1. The combination in one machine of a motor and generator, the armatures of which are fastened to the same shaft, the field magnets of said motor and generator being magnetically connected but electrically entirely separate from each other.

2. The combination in one machine of a motor and generator, the armatures of which are fastened to the same shaft, the field magnets of said motor carrying each a series and shunt coil wound so as to aid each other, said series coil being composed of resistance wire and used as the resistance, the field magnets of said generator carrying a shunt coil part of which is composed of resistance wire and used as the variable resistance by which said generator is governed.

DAVID H. WILSON.

Witnesses:
EMMA ELLIOTT,
D. M. CARTER.